United States Patent [19]

Barner et al.

[11] 4,195,351
[45] Mar. 25, 1980

[54] LOOP CONFIGURED DATA TRANSMISSION SYSTEM

[75] Inventors: Robert P. Barner, Rockville, Md.; Anne M. Gulick, Carmel; John A. deVeer, Millbrook, both of N.Y.; Jan G. Oblonsky, Brookeville, Md.

[73] Assignee: International Business Machines Corporation, Armonk, N.Y.

[21] Appl. No.: 872,853

[22] Filed: Jan. 27, 1978

[51] Int. Cl.² .......................................... G06F 15/16
[52] U.S. Cl. ............................... 364/900; 179/18 EA
[58] Field of Search ... 364/200 MS File, 900 MS File; 340/147 SC, 147 SY; 179/15 BF, 15 AL, 18 EA

[56] References Cited

U.S. PATENT DOCUMENTS

| Re. 28,811 | 5/1976 | Pierce | 179/15 AL |
|---|---|---|---|
| 2,986,723 | 5/1961 | Darwin | 340/147 SY |
| 3,586,782 | 6/1971 | Thomas | 179/15 |
| 3,680,056 | 7/1972 | Kropfl | 364/900 |
| 3,755,789 | 8/1973 | Collins | 364/900 |
| 3,781,815 | 12/1973 | Boudreau | 364/900 |
| 3,786,419 | 1/1974 | Nick | 340/147 SY |
| 3,821,713 | 6/1974 | Broadhurst | 340/172.5 |
| 3,879,710 | 4/1975 | Maxemchuk et al. | 364/900 |
| 4,007,450 | 2/1977 | Haibt | 364/200 |
| 4,019,176 | 4/1977 | Cour | 364/900 |
| 4,048,446 | 9/1977 | Hafner | 179/15 BF |

Primary Examiner—Mark E. Nusbaum
Assistant Examiner—E. Chan
Attorney, Agent, or Firm—J. Jancin, Jr.; James A. Kunkle

[57] ABSTRACT

A data transmission system which includes stations connected in a closed loop configuration with interface capabilities at each station to connect to an external data processor. Through this configuration simultaneous transmission of data among processors connected to stations on the loop can be carried out by transmission of data around the loop between particular stations. Data is transmitted from a first processor to its individual station connected to the loop. This first station formats the data received from the first processor into frames of multi-bit configuration which are transmitted around the loop to a second station which is connected to a second processor. Data received by the second station is stored and transmitted to the second processor. During the time that this transmission from the first processor to the second processor is being carried out a transmission between other processors connected to stations on the loop can also be carried out. Each station on the loop receives all frames being serially transmitted around the loop and after examination of the address section of the frame will keep frames designated for that particular station and will pass on those frames addressed to other stations on the loop. Each of the stations connected in the loop is an identical unit including a clock generator and synchronizer with no master station being designated for control functions, therefore, no control lines other than a clock timing line are included in the loop. A bypass function selects an alternate path around a station on the loop to permit faulty stations to temporarily be disconnected from the loop bus. Each station has a purging capability which permits frames which have parity errors or illegitimate addresses to be removed from the loop.

11 Claims, 12 Drawing Figures

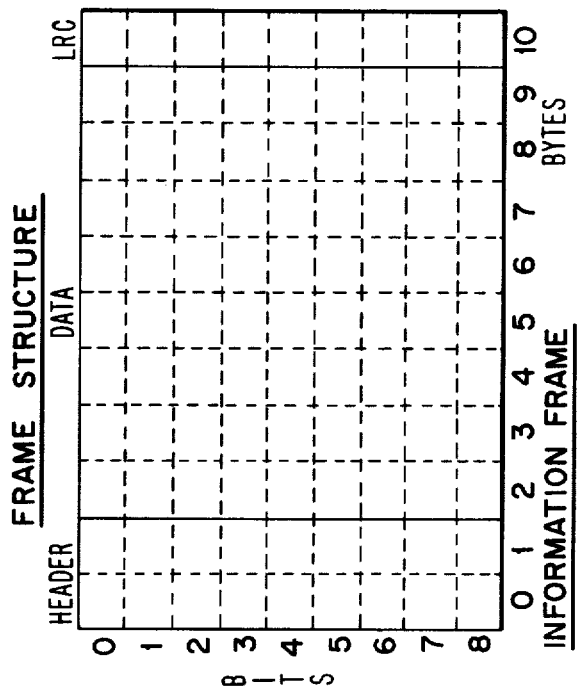
FIG. 6 FRAME STRUCTURE
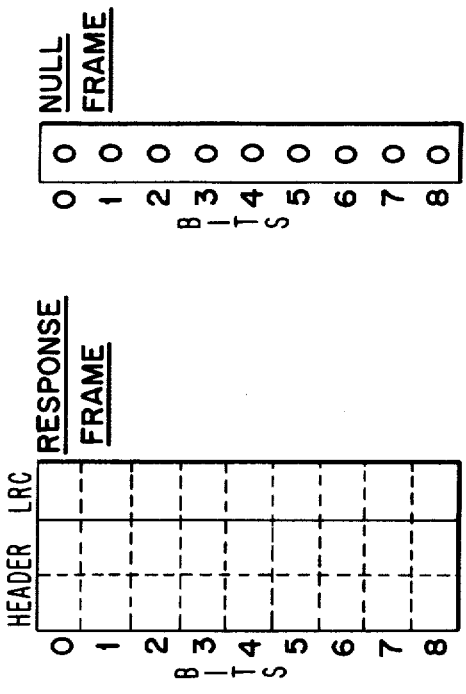
FIG. 8 NULL FRAME
FIG. 7 RESPONSE FRAME
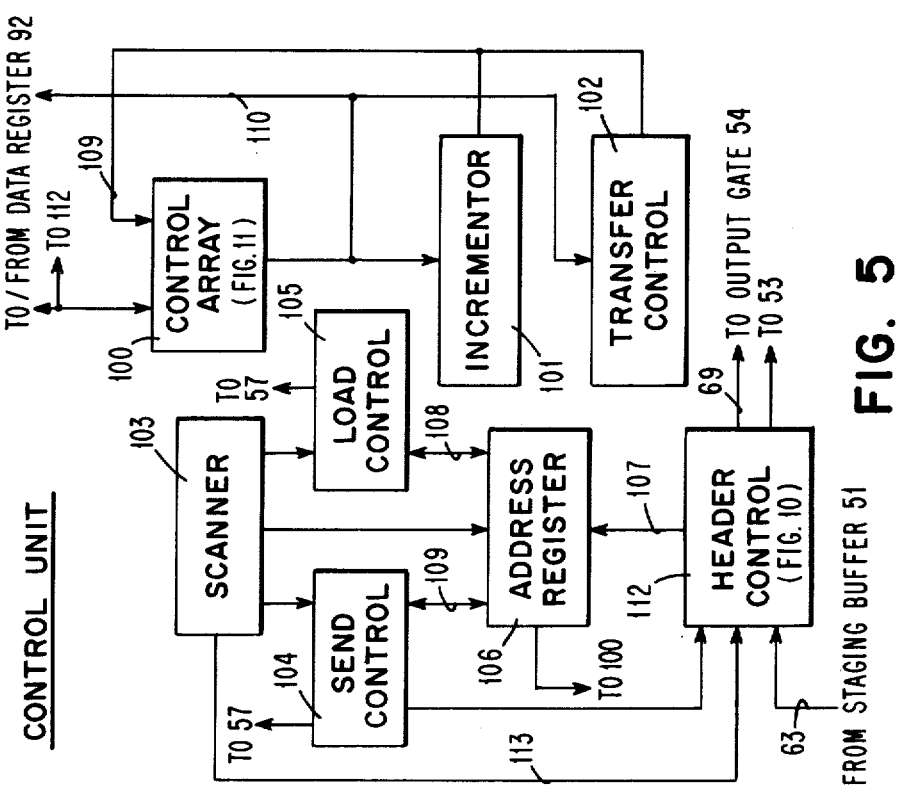
FIG. 5 CONTROL UNIT

LOOP CONFIGURED DATA TRANSMISSION SYSTEM

BACKGROUND OF THE INVENTION

1. Field of the Invention

This invention relates to digital data communication between stations connected in a series loop configuration which does not require a master control unit and carries out memory-to-memory communication between processors attached to the loop stations.

2. Description of the Prior Art

Present multi-processor systems perform communication between processors in a channel mode wherein dedicated lines and connections are arranged between the processors through an I/O control unit. This requires extensive lines for interlock control and data transmission between any two processors. U.S. pat. Nos. 4,014,005 and 3,916,380 describe typical systems which carry out this dedicated channel mode of communication between processors.

In certain applications advantages over the dedicated channel mode have been found in the loop configuration with a common buss connecting the attached units. This gives flexibility in permitting a processor to be attached to the loop for carrying on communication with any other processor attached to the loop.

The present loop communication systems between processors use a master controller attached to the loop for directing communication between all attached processors. The control functions are carried out by using separate control lines on the loop, polling techniques between processors on the loop for direction of transmission and extensive interlock protocol. U.S. Pat. Nos. 3,639,904; 3,659,271; 3,876,838; 3,879,710; 3,883,693; 4,002,842 are typical of the loop system with a separate control unit.

Other loop communication systems use a fixed time frame format for synchronization between attached processors. This technique allots a specific time frame for each processor on the loop to transmit or receive data during the time frame or frames assigned to that processor. This type system is limited in speed and capacity by (i) the allotment of time frames to processors which have no data at that particular time to communicate, and (ii) the interlocking of the master unit which generates the frames. U.S. Pat. Nos. 3,483,329; 3,544,976; and 3,755,789 each disclose a fixed time frame communication system.

To summarize, the prior art systems for communication between processors are of the dedicated channel type which require extensive lines and interlock control; the loop communications system with the added complexity of a master control unit attached to the loop; or the loop-type system with the assigned time frame mode of communication having the limitations of low capacity and slow communication time.

OBJECTS OF THE INVENTION

In line with the foregoing, it is an object of this invention to provide an improved multi-processor communication system wherein each processor is associated with a station that is connected with other stations associated with corresponding other processors, in a loop configuration.

Another object of this invention is to provide a loop configured data transmission system which permits simultaneous communication between connected processors.

It is a further object of the invention to provide a loop communication system which uses positive response protocol to control transmission on the loop.

A further object of the invention is to transmit loop information in an improved frame format.

It is still another object of the invention to include a purging function which will remove frames with error addresses or error data.

It is a further object of the invention to automatically bypass a faulty station on the loop.

It is yet another object of the invention to provide a loop communication system with each station having identical clock generator means which are synchronized to the clock pulses arriving on the clock line from the preceding station on the loop which eliminates the need for a separate master control station.

SUMMARY OF THE INVENTION

In accordance with the invention multiple stations as arranged in a serial loop and communication between processors is carried out by having each processor connected to an individual station with data from the processors being transmitted around the loop between designated stations.

Message transmission between stations on the loop is carried out by passing frames of multi-byte segments from any station to any other station in one direction around the loop.

The three different types of frames which can be transmitted on the loop are information frames, response frames, and null frames. The information frame carries the data being transmitted from processor to processor and is transmitted around the loop between the two stations connected to the processors. The response frame is sent as a reply from the station which receives the information frame to indicate to the station which has transmitted the information frame that this frame has been received. The null frame is transmitted during all times when information or response frames are not being transmitted. Recognition of a null frame by any station on the loop is an indication that the loop is available for use.

Information frames and response frames contain the address of the sender station and the receiver station. Each station on the loop examines all frames as they pass around the loop and based on the address of the frame will either pass the frame on to the next station on the loop or will tore the frame for transmission to the processor attached to that station.

Each station has the capability as it examines frames passing around the loop to remove those frames which contain address errors or parity errors. In this way, frames which have incorrect station addresses will not continually pass around the loop searching for non-existent stations. Each station also has bypass capabilities which permit the station to direct frames onto the next station without passing through a station which is non-operative or operating in a faulty mode.

Each station has the capability to place data received from a processor into frame format for transmission on the loop to another station. Each station also has the capability to take a frame received from another station on the loop and convert the data in the frame format into a format suitable for transmission to the processor.

These and other features of the invention will appear in the following description of the preferred embodiments along with the accompanying drawings.

BRIEF DESCRIPTION OF THE DRAWINGS

FIG. 5 is a block diagram of the control unit which is a function of each station.

FIG. 6 is a schematic drawing of an information frame.

FIG. 7 is a schematic drawing of a response frame.

FIG. 8 is a schematic drawing of a null frame.

DETAILED DESCRIPTION

Figure 1:
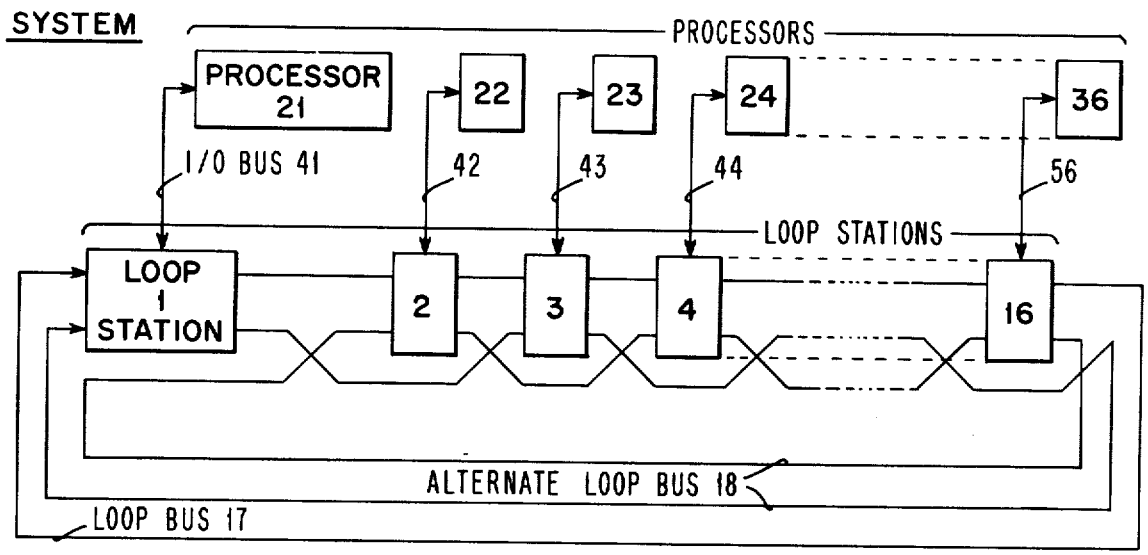
FIG. 1 is a schematic drawing of the loop configured data transmission system.

The loop configured data transmission system is shown in FIG. 1. Stations 1 through 16 are arranged in a loop configuration connected by loop bus 17 and also by alternate loop bus 18. Processors 21 through 36 are connected to stations 1 through 16, respectively, by respective individual input/output (I/O) busses 41 through 56.

Figure 2:
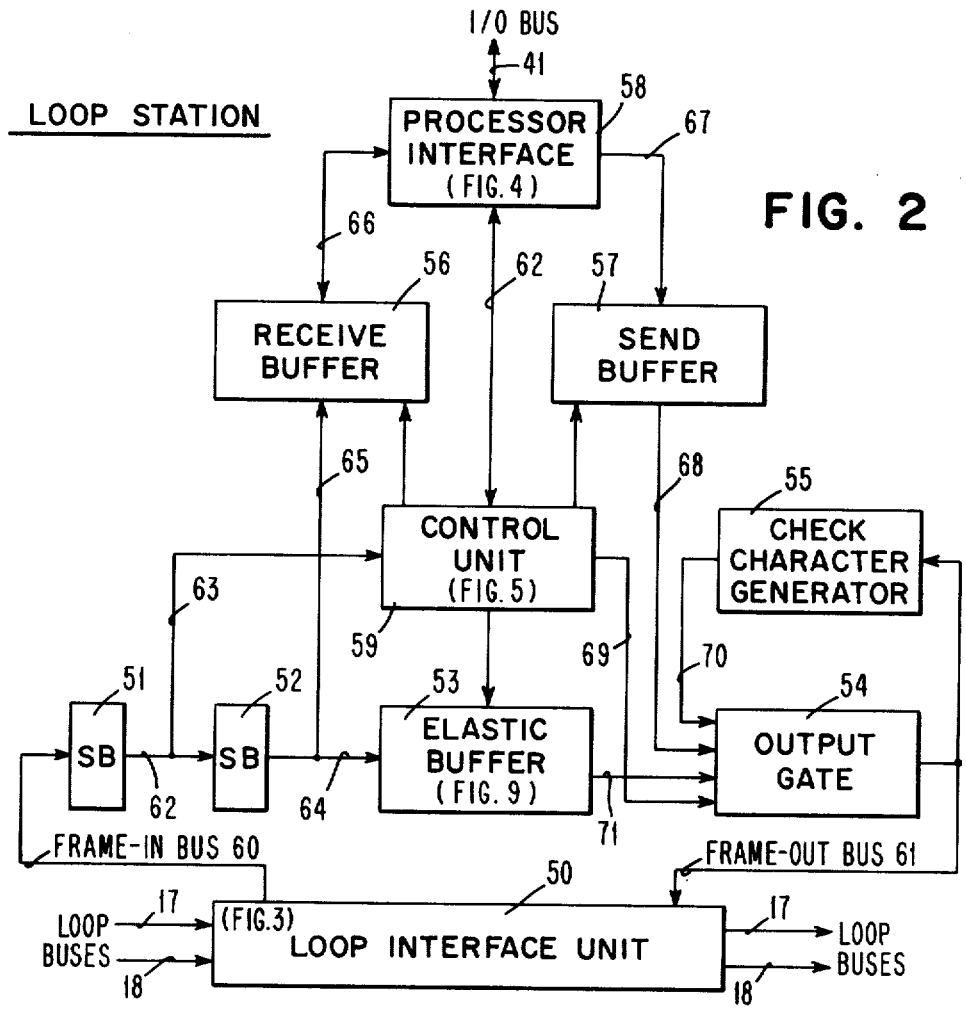
FIG. 2 is a block diagram of a station.

Referring to FIG. 2, the apparatus of a station will be described. Loop interface unit 50 receives frames (to be fully described hereinafter) passing around the loop either on loop bus 17 or alternate loop bus 18 (during the bypass function to be described hereinafter). The frames received by loop interface unit 50 will be passed there through and out onto the loop bus 17 or will be transferred to a staging buffer 51 by way of the frame-in bus 60. Staging buffer 51 serves as a temporary storage for each byte of data passed into the station from the loop. During the one clock cycle that a byte of data is store in staging buffer 51 decisions are made by the header control 112 (FIGS. 5 and 10) as to the identity and the validity of the byte. The byte is then passed to staging buffer 52 which stores the byte for one more clock cycle during which decisions are made based on the identity of the bit to store the byte in receive buffer 56 or pass the byte into elastic buffer 53. The byte is passed into the receive buffer if the frame containing the byte is addressed to this loop station. The byte is passed onto the elastic buffer if the frame containing the byte is to be passed onto another station on the loop. The receive buffer 56 contains a one-byte wide, 256-byte deep buffer array. Sixteen sets of two consecutive 8-byte buffer sections in receive buffer 56 are designated A-buffer and B-buffer, respectively. These A and B buffers are reserved for frames received from the loop with addresses designating that the frame is to be received by this station. Elastic buffer 53 which is 16-bytes deep is used to store a frame of information which is to be passed onto the next succeeding station during the time that the frame out bus 61 is busy transmitting data onto the loop bus 17. When the frame out bus 61 becomes inactive, elastic buffer 53 will transmit the frame along line 71 through the output gate 54 onto the frame-out bus 61, and from there onto the loop bus 17 to the next station on the loop. Each byte of data within a frame which is designated by address for reception by a specific station, e.g., 1, will be stored into that station's receive buffer 56 into the proper A or B buffer selected by control unit 59 according to the address of the originating station until all 8 bytes of incoming data are stored. Data to be transmitted to processor 21 (see also FIG. 1) is transferred from the receive buffer 56 onto the line 66 into the processor interface 58. The details of the transfer of data to and from processor interface 58 will be described hereinafter in connection with FIG. 4. Processor interface 58 receives data from processor 21 by I/O bus 41, and transmits this data to the send buffer 57 through line 67. The size and partitioning of the send buffer 57 are the same as described above for the receive buffer 56. Also, control information is passed from processor interface 58 to the control unit 59 through line 62. Frames from output gate 54 are transferred onto the frame-out bus 61 and also transmitted to the check character generator 55 which generates a longitudinal redundancy check character for each frame and transfers this check character to the frame out bus by way of line 70 and output gate 54.

LOOP INTERFACE UNIT

Figure 3:
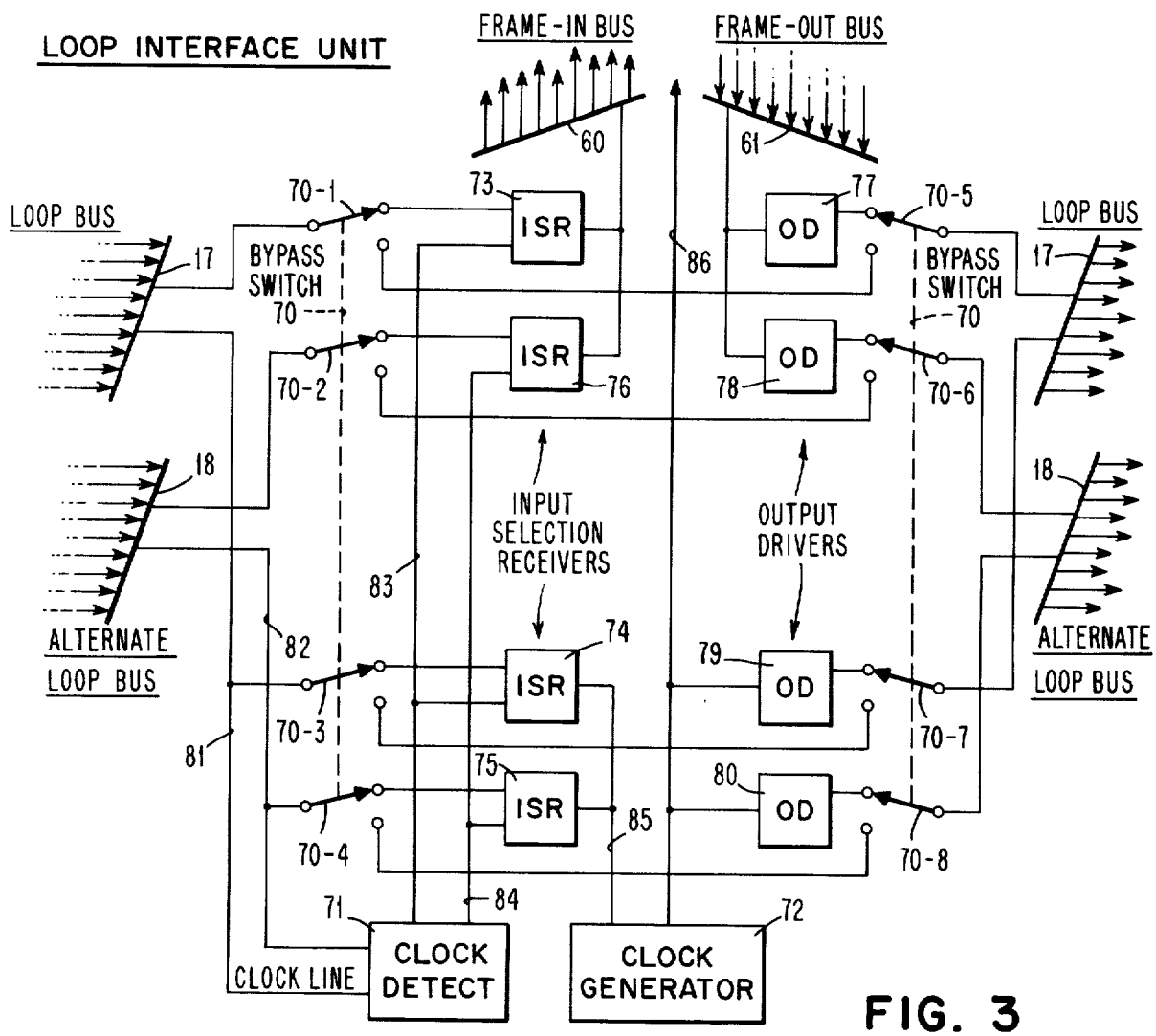
FIG. 3 is a block diagram of the loop interface unit.

Referring to FIG. 3, the loop interface unit 50 (see also FIG. 2) performs the frame-in/frame-out function, the bypass function, and the clock generator function.

The loop busses 17 and 18 each include ten parallel lines with nine lines carrying digital data and one line carrying clock bits. In the normal mode, the nine data lines of loop bus 17 are read into a station (e.g., station 1) through the normally closed points of bypass switch 70-1 through input selection receiver 73 and onto the frame-in bus 60. Frames to be transmitted from the station are sent through frame-out bus 61, output driver 77, the normally closed points of bypass switch 70-5, and onto the loop bus 17 to the next succeeding loop interface unit 50. Frames transmitted from the station are also sent through output driver 78, the normally closed points 70-6, and onto alternate loop bus 18. The clock signals on the loop bus 17 are gated through the normally closed points of bypass switch 70-3, from line 81 through input selection receiver 74, line 85, and to the clock generator 72. The clock signals are also gated into clock detect 71 by way of line 81.

The bypass function which can operate in two different modes, alters the normal routing of the lines through loop interface unit 50. Briefly stated in the first mode, a mechanical bypass switch 70 is operated manually at a particular station (e.g., station 1) to cause that station to be bypassed by loop bus 17 and also alternate loop bus 18, effectively placing the station in a non-operative condition and causing all frames passing through the loop to bypass that station. On the other hand, in the second mode of bypass operation, the bypass apparatus detects the absence of clock information being transmitted from the preceding station (e.g., station 16), and operates logical gates to permit the reception of data from alternate loop bus 18 instead of loop bus 17, thereby effectively bypassing the previous station.

In the first mode, mechanical bypass switch 70 is manually switched so that the normally open points are closed. Accordingly, data on the nine data lines of loop bus 17 are transmitted through the transferred contacts of the normally open points of switch 70 so as to bypass the devices 73 and 77 to the output side of bus 17. The loop bus therefore is routed straight through the normally open points of the bypass switch 70-1 and 70-5 without being read into the station. Signals appearing on the clock line 81 are also routed through the normally open contacts of bypass switch 70-3 around, but not through, input selection receiver 74 and output driver 79 through normally open contacts 70-7 and onto loop bus 17. The alternate bus loop 18 is also routed around input selection receiver 76 and output driver 78 through the normally open points of bypass switch 70-2 and 70-6. Correspondingly, clock line 82 is also routed through the normally open points of bypass switch 70-4 and 70-8 around, but not through, input selection receiver 75 and output driver 80. In this first mode with bypass switch 70 operated, loop bus 17 and alternate loop bus 18 including both sets of clock lines, are routed straight through to the next succeeding station without being read into the particular station which performs the bypass switch transfer operation just described.

As stated hereinabove, clock detect 71 detects the absence of clock signal, therefore in the second mode, the bypass operation is automatically initiated by the clock detect 71 logically gating input selection receivers 76 and 75 and degating input selection receivers 73 and 74. In other words, upon failure of clock detect 71 to detect clock pulses from a previous station (e.g., station 16) on line 81, clock detect 71 activates line 84 which gates input selection receivers 76 and 75 and deactivates normally activated line 83 which degates input selection receivers 73 and 74. This causes data on alternate loop bus 18 to be read through input selection receiver 76 onto the frame-in bus 60 into the station (e.g., station 1) instead of the loop bus 17 through input selection receiver 73. Clock detect 71 also gates clock line 82 from the alternate bus through input selection receiver 75. This bypass mode of reading data from the alternate loop bus 18 will stay in effect until normal clock functioning is detected on line 81 by the clock detect unit 71, which indicates that the previous station (e.g. station 16) is again functioning properly. Upon detection of normal clock pulses, the clock detect unit 71 will logically transfer its corresponding station to the normal mode of reading data on the loop bus 17.

Clock generator 72 is a phase-locked loop generator with feedback characteristics which generate an integral number of uniform clock pulses that are circulated around the loop. The clock signals generated by clock generator 72 and transmitted on line 86 are used by the station and also by output drivers 79 and 80 to drive the clock lines of the outgoing normal and alternate loop busses 17 and 18. Clock signals are received by the clock generator from a preceding station on the loop on line 85 through input selection receiver 74 through switch 70-3 and line 81 from the loop bus 17. Transmission of clock pulses to a succeeding station on the loop are from clock generator 72 on line 86 through output driver 79 and switch 70.7 onto loop bus 17. Since the clock generator is a phase-locked loop generator with feedback, each pulse received from a preceding station will generate a pulse synchronized to such input pulse. Thereby, the clock generator 72 at each of the loop stations will generate clock pulses to a succeeding station on the loop which are synchronized by pulses received from a preceding station on the loop. In the case of station failure or powerdown conditions, the clock generator output is disabled thereby causing the following station on the loop to switch to the alternate loop bus under control of the clock detect 71.

PROCESSOR INTERFACE

Figure 4:
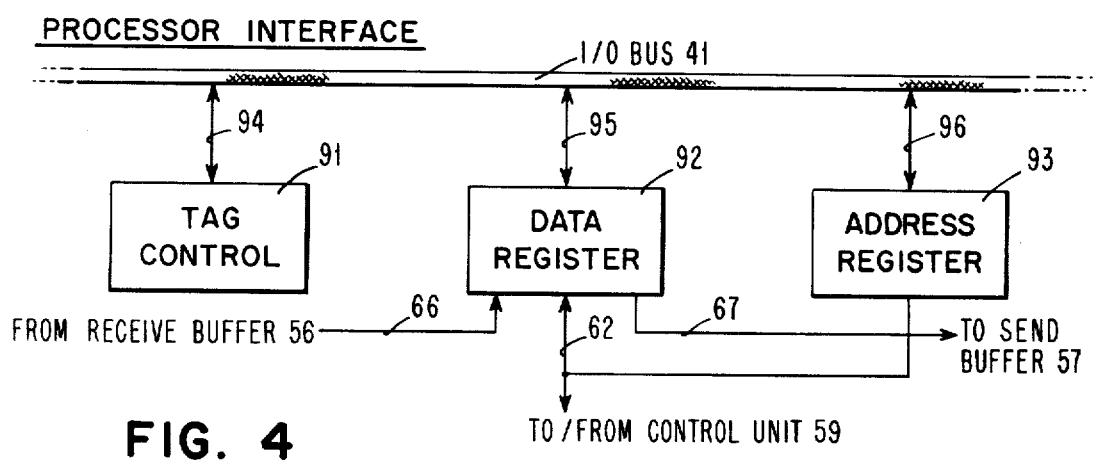
FIG. 4 is a block diagram of the processor interface which is a function of each station.

Referring to FIG. 4, processor interface 58 (see also FIG. 2) performs the function of interlocking a station (e.g., station 1) with a processor 21 (see also FIG. 1) to control setting up of address locations, performing tag control functions for handshaking routines, and transmission as well as reception of data.

The processor apparatus disclosed in Bouknecht et al U.S. Pat. No. 4,038,641 is applicable for adaptation by persons skilled in the art to the loop configuration system described herein. See also Bouknecht et al U.S. Pat. No. 4,038,642.

Tag control 91 (FIG. 4) interprets and responds to tag lines (to be described hereinafter) which control transfer of data and interpretation of processor commands to the station. The data register 92 receives or sends data from or to the I/O bus 41 (see also FIG. 2) by way of data line 95. Register 92 also transmits to or receives from control unit 59 over a 2-byte wide line 62. Data register 92 assembles two consecutive bytes of data received from the receive buffer 56 of FIG. 2 for transmission to the processor and also disassembles two bytes received from the processor into two consecutive bytes for loading into the send buffer 57 of FIG. 2 for transmission around the loop. The address register 93 (FIG. 4) interprets the device address of the I/O command from the processor to the station and stores the processor address of the 2-byte word to be transferred to or from the processor storage under control of the processor interface 58.

CONTROL UNIT

Referring to FIG. 5, unit 59 (see also FIG. 2) initiates and/or controls all functions of the station. The main components include control array 100, incrementer 101, transfer control 102 scanner 103, send control 104, load control 105, address register 106, and header control 112. The control array 100 (see also FIG. 11) stores the control blocks which control communications between the processor and any one of the sixteen stations on the loop. A receive control block (RDCB) controls receiving of data from a station to a processor, whereas a send control block (SDCB) controls sending of data from a processor to a station. Since the present system is described in terms of a sixteen processor capacity, the control array 100 therefore can contain sixteen receive control blocks (RDCB) and sixteen send control blocks (SDCB).

The input and output of the control array 100 are connected to incrementor 101, transfer control 102, and the data register 92 (see also FIG. 4). The address register 106 is an 8 bit register indicating the particular word in control array 100 which is to be accessed. The output of address register 106 is also connected to the header control 112 through line 107.

The send control 104, which controls transmission of data from station to processor contains a 4-bit register to store the number of a "device ready to send", and a "device ready" latch. The load control 105, which controls transmission of data from processor to station contains a 5 bit register to store load/unload bit and also the number of the "device ready to load/unload the send/receive buffer" and "device ready" latch.

Scanner 103 contains an incrementing register, the lower order 5 bits of which are used to specify the address of a control block in control array 100 and the upper two bits are used to mark a field in the transfer control word when a frame of data is sent. The remaining bits are used to properly adjust the maximum rate of change of the mark bits, so the response from a station to which the frame has been sent will under normal conditions be received before two consecutive changes of the mark bit pattern. The mark bits are stored in a two-bit field entitled "send cycle mark" in the scanner of the "send station". These mark bits are used as a counter to mark the time that it takes for a response to be received from a station receiving an information frame after transmission of the frame from the send station. The output from the lower order 5 bits of scanner 103 is connected to the send control 104 and also to the load control 105, and to the upper 5 bit portion of the address register 106.

INFORMATION FRAME

Referring to FIG. 6, the information frame shown is the basic carrier of data between stations on the loop. For example, an information frame may be transmitted from station 1 to station 4 and station 4 transmits a response frame (FIG. 7) to station 1 to indicate proper reception of the transmitted information frame. Null frames are transmitted by each station during those byte times that no other transmission is taking place, therefore, a null frame indicates to a station that the loop is available for transmission.

The information frame consists of 11 bytes of nine parallel bit each. The bytes 0 and 1 are the header section which contain address information, bytes 2 through 9 contain data, and byte 10 contains the longitudinal redundancy check (LRC) character. The particular information contained in the information frame is as follows:

Byte 0: bit 0—Reserved bits 1–4—Destination Station Address bits 5–6—Frame type="1 0" Information bit 7—Sequence number bit 8—Odd parity bit Byte 1: bit 0—Reserved bits 1–4—Origin Station Address bits 5–6—Set to "1 1" bit 7—Same as byte 0, bit 7 except complement on last frame bit 8—Odd parity bit Bytes 2–9: Eight data bytes, last frame padded with blanks. Byte 10: 9 bit odd parity Longitudinal Redundancy Character LRC.

RESPONSE FRAME

Referring to FIG. 7, the response frame shown is used to acknowledge the correct reception of an information frame at the receive station. The response frame consists of three bytes of parallel data with byte 0 and 1 containing header information and byte 2 containing the LRC character. The response frame contains the following information:

Byte 0: bit 0—Reserved bits 1–4—Destination Station Address bits 5–6—Frame type="1 1" (Response) bit 7—Sequence number of corresponding information frame bit 8—Odd parity bit Byte 1: bit 0—Reserved bits 1–4—Origin Station Address bits 5–6—Reserved bit 7—Same as byte 0, bit 7 bit 8—Odd parity bit Byte 2: 9 bit odd parity Longitudinal Redundancy Character (LRC)

NULL FRAME

Referring to FIG. 8, the null frame shown contains one byte of all zero bits. It is used as an indicator to all stations on the loop that no transmission of information frames or response frames is taking place, and the loop is available for use. Each information frame and response frame is separated by one or more null frames.

ELASTIC BUFFER

Figure 9:
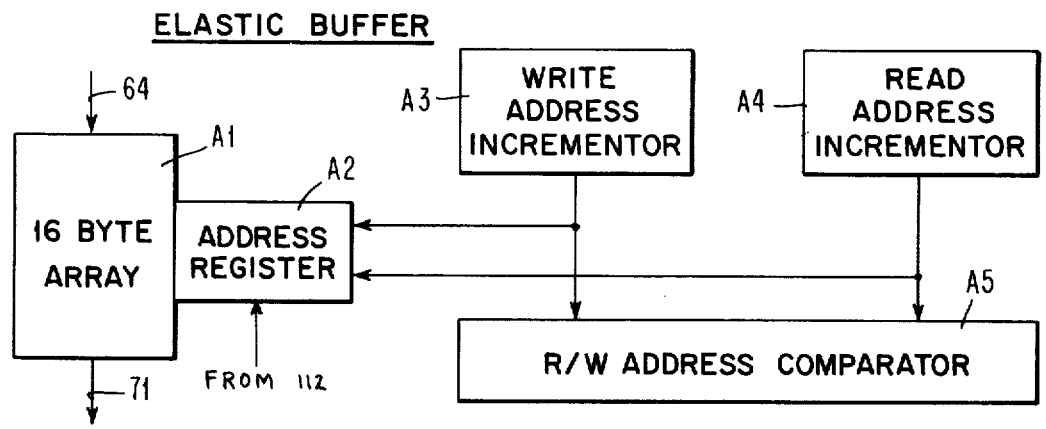
FIG. 9 is a block diagram of the elastic buffer.
Figure 9A:
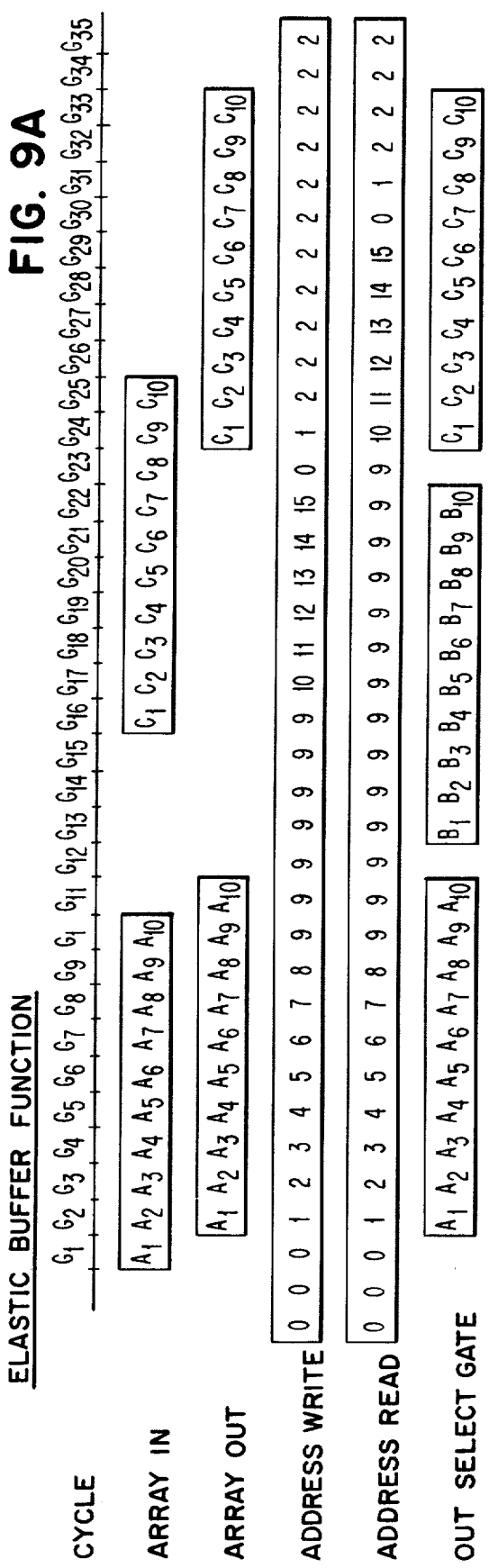
FIG. 9a is a timing diagram of an elastic buffer function.

Referring to FIG. 9, the elastic buffer 53 (see also FIG. 2) serves as a temporary storage unit for a frame arriving at a station on frame-in bus 60 when said frame is addressed to another station on the loop. If station 1 is transmitting a frame, for example frame B, from send buffer 57 through output gate 54 and onto the frame-out bus 61 at the same time a frame addressed to station 2, for example frame C, arrives on its frame-in bus 60, frame C addressed to station 2 is stored in elastic buffer 53 until frame B has been completely transmitted and output gate 54 as well as frame-out bus 61 available. Frame C is then transmitted by the elastic buffer 53 to the output gate 54. FIG. 9A which is hereafter described shows the timing of elastic buffer 53 operations during a temporary storage function.

The elastic buffer 53 contains a one-byte wide, 16 bytes deep array A1 (see also FIG. 9) with address register A2, a one 4 bit write address incrementor A3, a one 4 bit read address incrementor A4, and a 4 bit read/write address comparator A5. The data input of the array A1 is connected to the second staging section 52 (see also FIG. 2), while the data output of the array A1 is connected to the output gate 54. The 4 bit address outputs of both address incrementors A3 and A4 are connected to array address register A2 and to comparator A5.

The array A1 may write one byte and read one byte during every cycle of the station clock generator 72. The elastic buffer 53 is directed by the "read" and "write" control signals from the control unit 59. When array A1 is directed to write, one byte at the data input 64 is stored into the address indicated by the write address incrementor A3 and the contents of A3 is incremented by one.

When array A1 is directed to read, one byte from the address indicated by the read address incrementor A4 is read and placed on the output 71 of the array A1, and the contents of the read address incrementor A4 is incremented by one. When both "read" and "write" control signals are activated, one byte is stored into and one byte is read from the array A1 in one station clock cycle and both the write address incrementor A3 and read address incrementor A4 are incremented by one. Since the write address incrementor A3 contains the address where the incoming byte will be stored in the array A1 and the read address incrementor A4 contains the address where the next byte will be read from the array A1, the relationship between the contents of the incrementors A3 and A4 then determines the amount of delay provided by the elastic buffer 53. If the contents of both incrementors A3 and A4 are equal, the same byte is stored and then read from the array A1 in succeeding clock cycles. In this case the elastic buffer 53 provides just a one cycle delay between its data input and output.

If the contents of both the write address incrementor A3 and read address incrementor A4 are not equal, but differ, e.g., by k, then in a sequence of consecutive simultaneous "read" and "write" cycles executed, any byte from the data input 64 will be stored in array A1 and then read out of array A1 (k+1) cycles later. The difference k is defined here as the number of cycles the read address incrementor A4 must execute in order to make its contents equal to the contents of the write address incrementor A3 (if this remained constant).

When the station is either "powered on" or reset, the contents of both the write address incrementor A3 and the read address incrementor A4 are set to zero. When any of the incrementors reaches its maximum value, e.g., 1111, it will wrap around to 0000.

At the end of each cycle, the contents of both the write address incrementor A3 and the read addres incrementor A4 are compared in the R/W address comparator A5 and if not equal, a signal is sent to the control unit 59 of FIG. 2 indicating that the elastic buffer 53 is not empty.

Referring to FIG. 9a, the timing chart therein for an elastic buffer function represents a snap shot of station activity in thirty-five consecutive cycles during which two frames designated as A and C, respectively, arrive at the station prior to being passed on, and also a frame B which is created by the station and transmitted by output gate 54 onto frame--out bus 61 to loop bus 17 to the next station. The diagram in FIG. 9a indicates the data on input 64 as "array in" and output of array A1 on line 71 as "array out", the contents of the write address incrementor A3 as "address write", the contents of the read address incrementor A4 as "address read", and the data on output select gate 54 as "out select gate". Initial reset conditions prior to the first clock cycle G1 have reset both read and write addresses in the incrementors A4 and A3, respectively, to zero, and all data paths have empty bit signals. (i.e., null frames) In cycle G1, the first byte $A_1$ of the frame A appears on the "array in" to be stored at address 0, and the write address is incremented 1. In the next cycle, $G_2$, this byte is read from address zero to the out select gate. In the same cycle $G_2$, the next byte $A_2$ is stored in address 1 and the write address is incremented to 2. This process continues through cycle $G_{11}$, when the last byte $A_{10}$ of the frame A has been sent to the out select gate, and both the address write and the address read have been incremented to 9. Assuming that sometime during the passing of the frame A, a frame B became ready to be sent by this station from send buffer 57 and since there is no other frame arriving at "array in", frame B is transmitted after one empty byte following the end of frame A through the out select gate in cycles $G_{12}$ through $G_{22}$. While the frame B is being transmitted, another frame C arrives at the "array in" and is stored into the array A1 at write addresses 9 through 2. Only after the whole frame B has been sent out, is the frame C read out of the array A1 and sent through the out select gate in cycles $G_{24}$ through $G_{33}$. At the end, both read and write addresses are equal again, indicating empty buffer. Obviously, while frame A has passed through the elastic buffer with the delay of one cycle $G_1$ to $G_2$, frame C was delayed by eight cycles $G_{16}$ to $G_{24}$. The amount of delay provided by the elastic buffer is controlled by the time difference (in cycles) between the initiation of the array A1 writing and reading processes.

HEADER CONTROL

Figure 10:
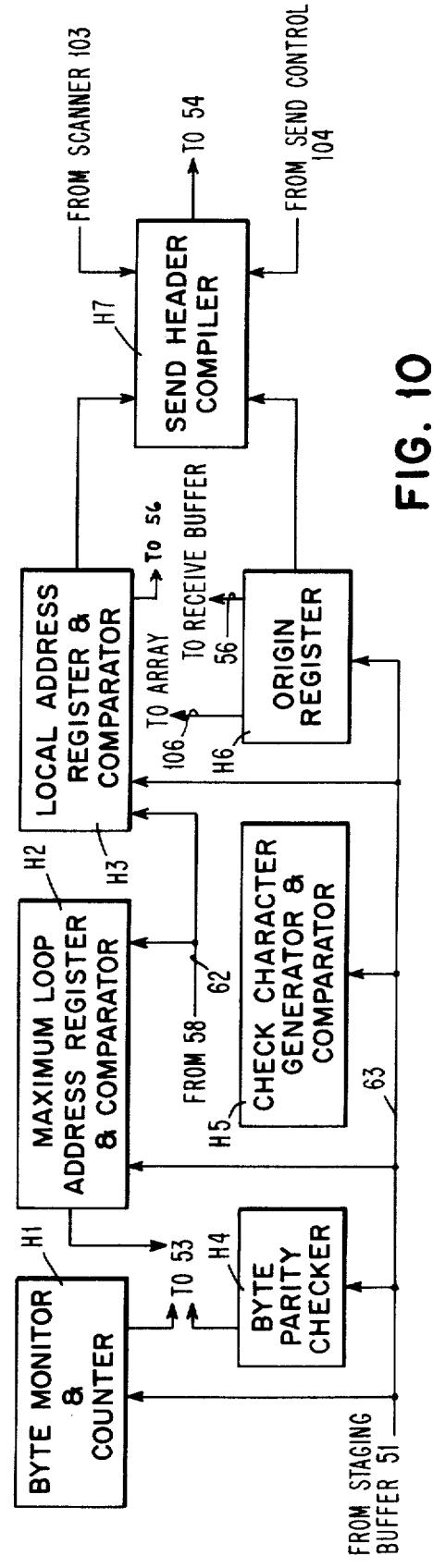
FIG. 10 is a block diagram of the header control.

Referring to FIG. 10, the header control includes a byte monitor & counter H1, maximum loop address register & comparator H2, local address register & comparator H3, byte parity checker H4, check character generator & comparator H5, and origin register H6. It also contains a send header compiler H7, whose output is connected to the output gate 54 (see FIG. 2).

Byte monitor & counter H1 contains circuits implementing the following functions:

(a) Recognize an null frame—a byte consisting of eight zeros and zero parity.

(b) Recognize the first non-empty byte following an empty byte as the first byte of a frame (c) Start the counter by the first non-empty byte of a frame, and stop it by the first empty byte encountered thereafter. This counter is used to identify the individual bytes of the frame by this and other circuits of the control unit 59.

(d) Examine the frame type (FT) field of the incoming frame, and recognize an information frame or a response frame or a null frame.

(e) Compare the recognized frame type with the counter status after the last byte of a frame. If the counter status (i.e., frame length) is not the one expected for the recognized frame type, the frame is in error and discarded (if addressed to this station), or truncated at the byte just leaving the second staging section 52 if the frame is being passed onto the next station. Truncation removes bytes from frames of incorrect length as they are passed onto succeeding stations on the loop.

The maximum loop address register & comparator H2 consists of a 4 bit register preloaded with the maximum loop address (MRA) and circuits implementing the following functions:

(a) Compare the destination address (DA) found in the first byte of an incoming frame with MRA, and if Da>MRA cause discarding of the frame.

(b) Compare the origin address (OA) found in the second byte of an incoming frame, and if OA>MRA cause discarding of the frame.

The local address register & comparator H3 consists of a 4 bit register preloaded with the local loop station address (LRA) and circuits implementing the following functions:

(a) Compare the destination address DA found in the first byte of an incoming frame with the LRA, and if Da=LRA cause an interception of the incoming frame by this station into the receive buffer 56, or if DA≠LRA cause passing of the incoming frame to the next station.

(b) Compare the origin address OA found in the second byte of an incoming frame with the LRA, and if OA=LRA and DA≠LRA cause discarding of the frame.

The byte parity checker H4 checks the odd parity of all non-empty bytes. If a parity error is found in the address bytes which are the first two bytes of a frame, or in any data byte of a frame addressed to the station, the frame is discarded. If a parity error is found in any byte but the first two address bytes of a frame being passed, the frame is truncated at the byte just leaving the second staging section 52.

The check character generator & comparator H5 examines all the bytes but the last byte of a frame, computes the longitudinal redundancy check character using the same rules as check character generator 55 (see also FIG. 2), and compares the computer check character with the one found in the last byte of the frame just examined. If the check characters are not equal, the frame is discarded if addressed to that station or truncated at the byte just leaving the second staging section 52 if the frame is being passed to the next station on the loop.

The origin register H6 is a 4 bit register which stores the origin address (OA) found in the second byte of the just intercepted frame. This (OA) stored in the origin register is used to select in the control array 100 (see also FIG. 5) the control block associated with the station which originated the frame. If a correct information frame is received, OA is also used to identify the proper segment in the receive buffer 56 and the destination address of the corresponding response frame header formed by the send header compiler H7.

The send header compiler H7 contains circuits for compiling the two byte header of the frames sent by the station. The contents of the local address register in H3 are used as the origin address and the address in the send control 104 or in the origin register H6 as destination address for information frames or response frames respectively.

CONTROL ARRAY

Figure 11:
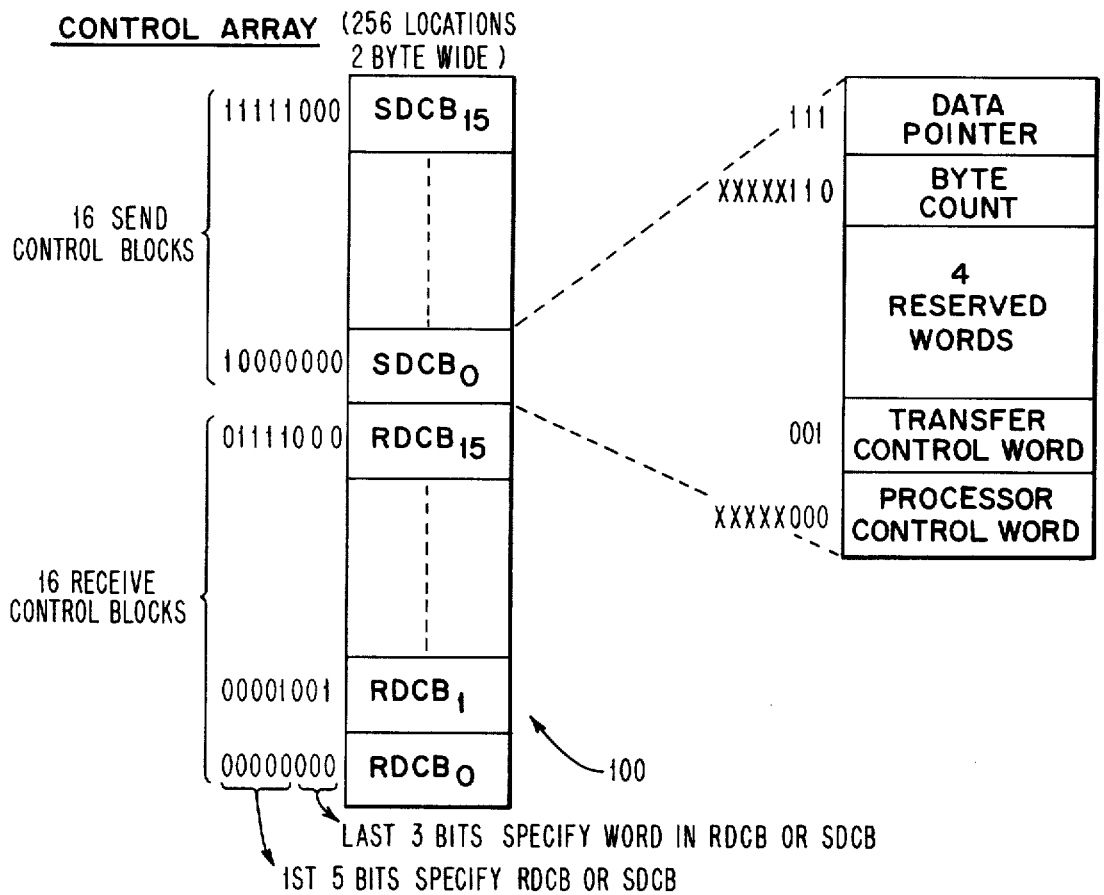
FIG. 11 is a schematic drawing of the control array.

Referring to FIG. 11, each of the 16 send control blocks SDCB and the 16 receive control blocks RDCB contain eight consecutive words reserved for the following information:

Word 0—Processor Control Word
Word 1—Transfer Control Word
Words 2-5—Reserved
Word 6—Byte Count
Word 7—Data Pointer The processor control word contains the processor I/O operation command code used by processor interface 58 (see also FIG. 1) when executing processor I/O commands.

The data pointer indicates the address in processor storage where the next transmission of two bytes of data on I/O bus 41 will be stored or fetched.

The byte count indicates the number of bytes to be transmitted by the I/O command to control the sending or receiving of frames around the loop to other stations.

The transfer control word for a sending device contains the following fields:

Busy/Idle Bit—Indicates that the stations have been initialized for use.

Data Transfer Bit—Indicates that the station is engaged in sending data.

Waiting/Ready Bit—Indicates that the station is waiting for a response frame.

Retry Count—A 3-bit field used to count the number of retransmissions of a frame. If a response frame is not received after seven transmissions, the receiving station will be considered inoperative.

Send Cycle Mark—A 2-bit field used to save the status of the mark field of scanner 103 at the time the frame is sent as an indicator of the length of time the waiting/ready bit has been in the "waiting" status.

Sequence Number Bit—This bit is altered and copied into the header of each data frame sent by the station. When a response frame is received, its sequence number is compared with this field to assure a one-to-one correspondence of information frames and response frames.

A Count Zero Bit—This bit is used to indicate the value of the byte count in the send control block has reached zero.

A/B Buffer Full—This 2-bit field indicates that the corresponding send buffer A or B has been filled.

Buffer Full Register Pointer—A 4-bit field which indicates which two bytes of the station buffer space are to be loaded next from the processor during the loading of the send buffer. The highest order bit of the buffer full register pointer is also used to indicate which buffer to send next if both the A and the B buffers are full.

The transfer control word for a receiving device contains the same fields as a transfer control word for a sending device with the exception of the sequence number bit being used by the receiving stations to check the proper sequence of received frames and the retry count and send cycle mark which are eliminated and replaced by five reserved bits.

GENERAL OPERATION

Before communications can take place between processors attached to stations on the loop, an initialization procedure must be carried out between each processor and the attached station, for example, processor 21 to station 1. Through a series of commands which will be described in detail, processor 21 stores control blocks (FIG. 11) in control array 100 of station 1 which specify by station address which other station or stations (for example, station 3) can send data to station 1.

RECEIVE INITIALIZATION

Each processor, for example, processor 21, attached to a station on the loop establishes which other processor/processors attached to a station/stations on the loop are authorized to transmit data to processor 21. This is carried out by processor 21 storing a separate receive control block (RCDB) in the control array 100 of station 1 for each station selected. Each RDCB (FIG. 11) stored in control array 100 implies the address of a particular station by the area where it is stored. Since this system has sixteen stations, there are up to sixteen RDCB's in the control array. The selection of a processor (for example, 22) for transmission of data to processor 21 is carried out by processor 21 storing RDCB$_1$ into the area of the control array 100 assigned to station 2 attached to processor 22.

This storing of data in selected control block addresses is carried out by each processor (for example, processor 21) issuing individual start commands to the attached station 1. The command "start AAA 0 XXXX" contains the 3-digit processor I/O address AAA of the attached station, "0" which designates a receive initialization command, and a 4-digit address XXXX of a particular RDCB area (for example, 1111) for RDCB$_{15}$ assigned to station 16 (see FIG. 11). The data stored in RDCB$_{15}$ of control array 100 in station 1 by processor 21 contains the (data pointer, byte count, transfer control word, and processor control word) which will receiving of data from station 16, attached to processor 36 by station 1, attached to processor 21.

In addition to the loading of particular RDCB's by the processor, the loading of an assigned station address (0 through 15 representative of stations 1 through 16 respectively) into local address register H3 of header control 11 (FIG. 10) is carried out. The maximum loop address which in this case is 15 is loaded into the maximum loop address register H2.

SEND INITIALIZATION

Initialization between the processor and its corresponding station for sending is similar to the receive initialization.

The command is "start AAA 1 XXXX." The AAA digits indicate the station addressed by the processor. The 1 digit in the start command indicates that the initilization command is for a send operation. The XXXX digits contain the address which specifies a particular send control block (SDCB) in the control array as shown in FIG. 11, for example, (SDCB$_0$) through (SDCB$_{15}$) for stations 1 through 16 respectively. Initialization therefor loads a particular control block from SDCB$_0$ to SDCB$_{15}$ in the control array 100 of FIG. 11 with the processor control word, transfer control word, byte count, and data pointer for each start command.

DATA TRANSMISSION FROM PROCESSOR TO STATION

After initialization of all stations by the attached processors, each loop station performs a scanning function to control the sending and receiving of data between stations on the loop. Scanner 103 (see FIG. 5) increments through all 16 addresses and serially transmits the addresses to register 106. Address register 106 sets the read of a particular control block in control array 100 designated by the scanning function. The transfer control word (TCW) which is word 001 of the control block (see FIG. 11), is read into the transfer control 102 (see also FIG. 5). The transfer control 102 checks the condition of all fields of the TCW and interprets from the condition of the bits in each field described in FIG. 11, the function which will be performed. During the send operation, data must be loaded from the processor to the station send buffer 57 (see also FIG. 2). Load control 105 receives the address from scanner 103 of the control block being addressed and indicates receiving of data from the processor through data register 92 (see also FIG. 4) into send buffer 57. The load control 105 goes through continuous cycles of accepting the data from the processor and updating the TCW, data pointer and byte count in the control block (FIG. 11). The data load operation from the processor to the loop station is ended by the buffer full bit of the TCW indicating full status of the assigned section of send buffer 57 or by the byte count diminishing to zero. At this point, the loop station has accepted data from the attached processor for transmission onto the loop to another station designated by the address of the control block for transmission SDCB. A station "device ready" latch within send control 102 (FIG. 5) is set.

STATION-TO-STATION TRANSMISSION

The setting of the device ready latch indicates that there are data available in the station to be transmitted onto the loop to another station. The sending station will place the information into the information frame format (FIG. 6) for transmission onto the loop. Transmission by the station will take place when there is no frame in the elastic buffer 53 (see also FIG. 2).

The first two bytes of the information frame constitute the header information and are compiled in the header control 112 of FIG. 10. The header information contains the origin station address and the destination station address. This information is transmitted by send header compiler H7 (see also FIG. 10) to output gate 54 (see also FIG. 2), where it is transmitted through the frame-out bus 61 onto loop bus 17. Referring to FIG. 6, and following the header information, the data information consisting of bytes 2 through 9 of the information frame are transmitted from send buffer 57 (see also FIG. 2) through output gate 54 and frame-out bus 61 to loop bus 17. The check character byte 10 which is based in the odd-even count in the data bytes is appended to the information frame following byte 9 by check character generator 55 through output gate 54 and onto bus 17.

The TCW within a control block (see FIG. 11) is updated to indicate the latest status of the buffer condition, and the waiting ready bit is set to "waiting". This completes the transmission of an information frame onto the loop by a station.

STATION-TO-STATION RECEPTION

The information frame will progress around the loop passing from one station to and through other station units until the destination station address in the header is recognized by header control 112 (see also FIG. 5) of the destination station. Recognition of the destination address takes place by the local address register & comparator H3 (see also FIG. 10) which compares the destination address of the information frame with the local address of a station. A compare equal designates a particular station as the receiver unit for the information frame. The TCW of the receiving station indicated by origin register H6 is read and stored in the TCW register 102. The eight data bytes are read into receive buffer 56 (see also FIG. 2) Byte monitor & counter H1 recognizes the end of frame condition and signals the send header compiler H7 to transmit a response frame to the sending unit to indicate proper reception of the transmitted information frame, if no errors have been detected.

The response frame structure (FIG. 7) includes header information in bytes 0 and 1, and a check character byte 2. If the response frame does not arrive at the origination station, based on a time count by the TCW as indicated by the waiting/ready bit and the mark bits, the transmitted information frame is considered as not being received by the destination station and a retransmission of the complete information frame takes place. When a response frame is received at the originating station, the TCW is updated by changing of the waiting-/ready bit from waiting to ready, the sequence bit, and the proper buffer full bit. If the buffer full bit is off, the buffer may be filled with additional data.

STATION-TO-PROCESSOR

Under control of scanner 103 (FIG. 5) stepping through control block addresses, the TCW of the receive station control block is addressed by address register 106, read by transfer control 102 and the buffer full bit "on" indicates that receive buffer 56 (see also FIG. 2) has data to transmit to the attached processor. The receive control block originally stored by the processor during the initialization procedure indicates in the data pointer (FIG. 11) the storage area in the processor designated for reception of the data. Transmission of the data from receive buffer 56 to the processor takes place through the data register 92 (see also FIG. 4) of the processor interface under control of the processor interface 58.

PURGING

Frames which are recognized by any station as having an illegitimate address are purged from the loop. This function is carried out in the header control (FIG. 10) by comparison of incoming header addresses with the maximum loop address by the maximum loop address register H2. Any address which compares in excess of the maximum loop address, for example, 15 stored in H2 is not passed through the elastic buffer 53 (see also FIG. 2), and therefore becomes eliminated at the station recognizing the incorrect address. Likewise, frames with incorrect data as recognized by the byte parity checker H4 in header control are not passed through the elastic buffer and are eliminated from further transmission around the loop.

PASSING OF FRAMES THROUGH A STATION

As each frame passing around the loop arrives at a station on loop bus 17, the frame is passed through staging buffers 51 and 52. If the frame is designated by the header for reception by another station than the one receiving the frame, the frame is passed through the elastic buffer via line 64 and to the output gate 54 via line 71 where it is transmitted back onto loop bus 17 via frame-out bus 61. If the station receiving the frame into elastic buffer 53 is busy transmitting onto the loop from its send buffer at that time, the frame is delayed in the elastic buffer until current transmission of the frame from the send buffer is complete. Following transmission of that frame, the elastic buffer will transmit the stored frame onto the loop bus.

BYPASS OPERATION

As described previously, the loop interface unit of FIG. 3 can be actuated by a manual switch 70 to cause all incoming frames to bypass a selected station. The loop interface unit can also be activated by failure of the previous station to cause bypassing of that station by gating of the input selection receivers under control of the clock detect 71. This operation is more fully described in FIG. 3.

NULL FRAME GENERATION

During the clock time that a station is not passing frame bytes onto the loop bus by way of the output gate, null frames which consists of all zero bits are passed around the loop each clock cycle. Recognition of a null frame by any station is an indication that the loop is available for use.

What is claimed is:

1. A communication system comprising:
    multiple stations connected in a masterless mode by a plurality of parallel data lines and a single clock line in a closed loop unidirectional configuration;
    data transmission means at each of said stations for transmission of data to another one of said stations over said data lines;
    a clock generator at each of said stations to generate clock pulses for transmission to the succeeding station over said clock line; the input to said clock generator connected to said clock line for receiving clock pulses from the preceding station, whereupon each of the clock pulses generated by said clock generator is synchronized to an input clock pulse received from said preceding station;
    data detection means associated with each of said stations for detecting the presence of data on any of said data lines at the input end of each of said stations, and for generating a signal during each of said clock pulses in which data is not present on any of said data lines;
    gate means at each of said stations operated by a respective station data detection means signal for gating the transmission of data from the output end of the respective station onto said closed loop;
    whereby data transmission from any one of said stations onto said closed loop can be effected by operation of said gate means during the first clock pulse immediately following a clock pulse in which data was not detected on any of said data lines at the input end of the station.

2. A communication system in accordance with claim 1 further including:
    a storage unit at each of said stations for storing data which arrives at a particular one of said stations from said closed loop during the time that said particular one of said stations is transmitting data onto said closed loop;
    whereby data transmission from a particular station can continue during the time that data is being received by that particular one of said stations.

3. The system as defined in claim 1 wherein the transmission of data between said stations are in a frame format;
    said frame format including:
    an information frame of eleven bytes with each of the bytes containing nine parallel digital bits of data;
    said information frame including a header section, a data section, and a LRC section;
    said header section containing a first byte having bits 0-4 containing destination station address information, bits 5-6 containing frame type information, bit 7 containing frame sequence number information and bit 8 containing byte parity information;
    said header section containing a second byte having bits 0-4 containing origin address information, bits 5-6 containing frame type information, bit 7 containing frame sequence number information, and bit 8 containing byte parity information;
    said data section within said information frame containing eight bytes of information data; and
    said LRC section within said information frame containing one byte of parity data for error detection.

4. The system according to claim 3 wherein said frame format further includes:
    a response frame of three bytes with each of the bytes containing nine parallel digital bits of data;
    said response frame containing a header section, and a LRC section;
    said response frame header section containing a first byte having bits 0-4 containing destination station address information, bits 5-6 containing frame type information, bit 7 containing frame sequence number information and bit 8 containing byte parity information;
    said response frame header section containing a second byte having bits 0-4 containing origin address information, bits 5-6 containing frame type information, bit 7 containing frame sequence number information, and bit 8 containing byte parity information;
    said response frame LRC section containing one byte of parity data for error detection;
    whereby said response frame is transmitted on said loop from a station which has received an information frame to the station which transmitted said information frame to thereby indicating proper response of said information frame.

5. The system according to claim 4 wherein said frame format further includes:
    a null frame of one byte containing nine parallel digital bits of zero data to indicate that the loop is available for transmission of data by any one of said stations reading said null frame.

6. A communication system comprising:

multiple stations connected in a masterless mode by parallel communication lines in a closed loop unidirectional configuration;

said parallel communications lines formed into a loop bus which enters into and exits from each of said stations thereby connecting said stations in a serial loop;

a first gating means at each of said stations which gates the loop bus at the input of its station to a frame-in bus;

a first driver means at each of said stations which drives a frameout bus to said loop bus at the output of its station;

a switch at each of said stations for operating multiple contact units;

each of said multiple contact units having a center leg, a normally closed leg, and a normally open leg, and a switching contact operated by its switch to connect said center leg to said normally closed leg when said switch is in the deactivated position and connects said center leg to said normally open leg when said switch is in the activated position;

a first of said multiple contact units having said center leg connected to said loop bus at the input of said station, said normally closed leg connected to the input of said first gating means, said normally open leg connected to said normally open leg of a second one of said multiple contact units;

said second one of said multiple contact units having its center leg connected to said loop bus at the output of said station, its normally closed leg connected to the output of said first driver means, said normally open leg connected to said normally open leg of said first one of said multiple contact units;

said switch in the activated position routing said loop bus from the input at said station directly to said loop bus at the output of said station;

whereby activation of said switch bypasses said loop bus around said station by connecting said loop bus at the input of said station to said loop bus at the output of said station without said loop bus entering said station.

7. A communication system in accordance with claim 6 further including:

a second gating means at each of said stations which gates a particular one of said parallel communication lines designated as the clock line on said loop bus at the input of said station to a clock generator;

a second driver means at each of said stations which drives a clock pulse at the output of said clock generator onto said clock line on said loop bus at the output of said station;

a third multiple contact unit having said center leg connected to said clock line at the input of said station, said normally closed leg connected to the input of said second gating means, said normally open leg connected to the normally open leg of a fourth multiple contact unit;

a fourth multiple contact unit having said center leg connected to the output of said clock generator, said normally closed leg connected to the output of said second driver means, said normally open leg connected to said normally open leg of said second gating means;

said switch in the deactivated position routing said clock line at the input of said station to said clock generator and also routing said clock pulse at the output of said clock generator onto clock line on said loop bus at the output of said station;

said switch in the activated position connecting said clock line at the input of said station directly to the clock line on said loop bus at the output of said station and also disconnecting said clock pulse at said clock generator output from said loop bus at the output of said station;

whereby activation of said switch causes said clock line to bypass said station and be directed onto said loop bus for reception by the next of said stations on said closed loop.

8. A communication system comprising:

multiple stations connected in a masterless mode by parallel lines in a closed loop unidirectional configuration;

data transmission means at each of said stations for transmission of information frames onto said closed loop, said information frames including a header section and a data section, said header section including an origin station address and a receiver station address;

each of said stations being assigned a station address which is stored in a local address register;

address comparator means at each of said stations which compares said origin stations address of each of said information frames which arrive at said station on said closed loop with said station address;

said address comparator means generating a signal when said origin station address of any of said information frames arriving at a particular one of said stations is equal to the station address of said particular station whereby said signal indicates that said information frame arriving at the particular one of said station has been transmitted by said station and has arrived at said station without having been received by another one of said stations on said closed loop;

a send buffer at each of said stations for storage of data received from an attached processor through the I/O bus for transmission of said data onto said closed loop;

non-destructive readout of said data from said send buffer during the transmission of said data onto said closed loop wherein said data is retained in said send buffer after said data has been transmitted;

said signal from said address comparator means controlling the readout of said send buffer; wherein said signal causes said send buffer to retransmit said information frame.

9. A communication system in accordance with claim 8 further including:

a counter actuated by said signal from said address comparator means to count the number of times a particular one of said information frames has been transmitted from a particular one of said stations and received at that particular one of said stations without having been received by another one of said stations.

10. A communication system in accordance with claim 9 wherein:

said counter controls said send buffer non-destructive readout means to cause removal of data from said send buffer when said counter reaches a selected total; and further including counter reset means actuated by said counter reaching a selected total.

11. A communication system including:

multiple stations connected in a masterless mode by parallel lines in a closed loop unidirectional configuration;

data transmission means at each of said stations for transmission of a frame of information wherein said frame contains a header section and a data section;

said header section comprising a destination station address and an origin station address;

each of said stations being assigned a local station address which is stored in a local address register;

a maximum loop address register at each of said stations for storage of the maximum station address of all of said stations which are connected to said closed loop;

a comparator which is connected to said maximum loop address register and also connected to said closed loop at the input of said station for receiving said header section of said frame arriving at said station on said closed loop;

said comparator generating an invalid address signal when either said destination station address or said origin station address in said header section of said frame is more than said maximum loop address;

wherein said invalid address signal indicates that said frame which has arrived at said station has an invalid address in said header section;

an elastic buffer at each of said stations connected to receive and store each of said frames which arrive on said closed loop at a particular one of said stations when said frame does not contain the local address of that particular one of said stations in said header section;

said elastic buffer also connected to transmit a stored frame onto said closed loop;

means operated by said invalid address signal for controlling said elastic buffer to prevent said stored frame from being transmitted onto said closed loop;

whereby any of said frames with an address in said header section which is higher than said maximum station address which arrive at a particular one of said stations will be purged from said closed loop.

* * * * *